(12) United States Patent
Ahne et al.

(10) Patent No.: US 10,802,658 B2
(45) Date of Patent: Oct. 13, 2020

(54) CAPACITIVE TOUCH SYSTEM

(71) Applicant: Facebook Technologies, LLC, Menlo Park, CA (US)

(72) Inventors: Adam Ahne, Snohomish, WA (US); Brian Cox, Seattle, WA (US); Andrew Doxon, Redmond, WA (US); Genevieve Walker, Seattle, WA (US); Morgan de Faye Timblin, Seattle, WA (US); Cailyn Austin Embring, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/273,360

(22) Filed: Feb. 12, 2019

(65) Prior Publication Data
US 2020/0257384 A1 Aug. 13, 2020

(51) Int. Cl.
*G06F 3/044* (2006.01)
*G06F 3/01* (2006.01)
*G02B 27/01* (2006.01)

(52) U.S. Cl.
CPC .......... *G06F 3/044* (2013.01); *G02B 27/017* (2013.01); *G06F 3/014* (2013.01); *G06F 3/016* (2013.01); *G02B 2027/0178* (2013.01)

(58) Field of Classification Search
None
See application file for complete search history.

(56) References Cited

U.S. PATENT DOCUMENTS

| 9,710,060 | B2* | 7/2017 | McMillen | H03K 17/964 |
| 10,665,018 | B2* | 5/2020 | Miller | G06F 3/012 |
| 2012/0139708 | A1 | 6/2012 | Paradiso et al. | |
| 2016/0363997 | A1 | 12/2016 | Black et al. | |
| 2017/0010130 | A1 | 1/2017 | Xu et al. | |

FOREIGN PATENT DOCUMENTS

CN 107145232 A 9/2017

OTHER PUBLICATIONS

International Search Report and Written Opinion received for PCT Application Serial No. PCT/US2020/016369 dated Apr. 20, 2020, 15 pages.

* cited by examiner

*Primary Examiner* — Duane N Taylor, Jr.
(74) *Attorney, Agent, or Firm* — FisherBroyles, LLP

(57) ABSTRACT

The disclosed computer-implemented method for determining a proximity status between electrodes may include detecting an amount of electrical charge an electrode among other electrodes that are communicatively coupled to an artificial reality device. The method may further include determining, based on the detected amount of electrical charge at the electrode, a mutual capacitance measurement that indicates an amount of mutual capacitance between the other electrodes. The method may also include determining, based on the mutual capacitance measurement, a relative proximity status between the electrodes, where the relative proximity status indicates a degree to which the electrodes are in proximity with each other. The method may further include providing the determined relative proximity status between the electrodes as an input to the artificial reality device. Various other methods, systems, and computer-readable media are also disclosed.

21 Claims, 15 Drawing Sheets

CAPACITIVE TOUCH SYSTEM

BACKGROUND

Artificial reality devices are becoming increasingly common. Many of these artificial reality devices employ some type of haptic feedback. This haptic feedback provides sensory inputs to users, causing the users to feel certain sensations when, for example, touching artificial objects in a virtual world. These haptic feedback systems are often incorporated into gloves, but may also be implemented in headwear, footwear, bodysuits or other wearable systems. Some types of haptic gloves may include conductive pads on the fingertips to detect touch between various areas of the body (e.g., between fingertips). When two such conductive pads touch, they form a galvanic connection causing current to flow, which is detected by electronic components. These galvanic connections, however, tend to get dirty and oily, resulting in unreliable connections. Moreover, conductive pads may short to each other causing further ambiguity in detection.

Other artificial reality systems use different means to determine when body parts such as fingers are touching. For example, some artificial reality systems may use infrared cameras pointed at the user's hands to determine when the user's fingers or tendons are moving. Then, from these movements, the artificial reality system may attempt to determine the moment at which the user's fingers are touching. In other systems, traditional cameras may be set up to look at the user's hand's pose which may show whether fingers are touching. In other cases, attempts have been made to attach detectors on the backs of the user's fingers and use magnetic fields to determine where those points are in space. Then, from this 3D positioning in space, the systems will attempt to determine when the user's fingers are touching. Still others have attempted to use cameras to look at color changes that occur in the user's fingernails when pressure is applied from touch. Such systems determine that a user's fingers have touched when the user's fingernails have sufficiently changed in color. None of these systems is particularly good at pinpointing when a user's fingers have touched. As a result, the immersive nature of the artificial reality experience may be greatly reduced for the user.

SUMMARY

As will be described in greater detail below, the instant disclosure describes methods and systems that effectively determine a proximity status between electrodes, indicating whether a user's fingers are touching.

In one example, a system may include at least two electrodes communicatively coupled to an artificial reality device. The system may also include a controller configured to detect an amount of electrical charge at at least one of the two electrodes and, based on the detected amount of electrical charge, determine a mutual capacitance measurement that indicates an amount of mutual capacitance between the two electrodes. The controller may also be configured to determine, based on the mutual capacitance measurement, a relative proximity status between the at least two electrodes, where the relative proximity status indicates a degree to which the electrodes are in proximity with each other. The controller may further be configured to provide the determined relative proximity status between the at least two electrodes as an input to the artificial reality device.

In some examples, the controller may determine the mutual capacitance measurement based on the detected amount of electrical charge at both of the at least two electrodes. In some examples, the controller may determine when insulators between the at least two electrodes are touching each other. In some examples, the controller may determine when the at least two touching insulators between the electrodes have ceased touching each other. In some examples, the system may include three or more electrodes communicatively coupled to the artificial reality device. In some examples, the controller may determine which two electrodes among the three or more electrodes are within a specified distance of each other.

In some examples, the at least two electrodes may be embedded within at least a partial glove configured to fit on at least a portion of a user's hand. In some examples, at least one of the electrodes may include a transducer configured to provide a tangible movement upon receiving a triggering input. In some examples, the transducer may be configured to provide the tangible movement while the controller determines the mutual capacitance measurement between the at least two electrodes. In some examples, signals controlling the transducer may be transferred over the same wire as signals used to detect mutual capacitance at the transducer. In some examples, the transducer may be a vibrotactor.

In some examples, the controller may receive feedback from at least one of the electrodes, and the controller may use the received feedback to calibrate other sensors communicatively coupled to the system.

In addition, a corresponding method for determining a proximity status between electrodes may include detecting an amount of electrical charge at at least one electrode among at least two electrodes that are communicatively coupled to an artificial reality device. The method may further include determining, based on the detected amount of electrical charge at the at least one electrode, a mutual capacitance measurement that indicates an amount of mutual capacitance between the at least two electrodes. The method may next include determining, based on the determined mutual capacitance measurement, a relative proximity status between the at least two electrodes, where the relative proximity status may indicate a degree to which the electrodes are in proximity with each other. The method may also include providing the determined relative proximity status between the at least two electrodes as an input to the artificial reality device.

In some examples, at least one of the electrodes may include a stretch sensor. The stretch sensor may be configured to detect an amount of stretch in the artificial reality device while the mutual capacitance measurement between the at least two electrodes is being determined. In some examples, the at least two electrodes may be embedded in an embroidered patch that is fastened to the artificial reality device. In some examples, the artificial reality device may include at least a partial glove. In such cases, a thumb covering of the glove may include at least two electrodes and an index finger covering of the glove may include at least two electrodes.

In some examples, the method may further include detecting a sliding movement between the at least two electrodes of the thumb covering and the at least two electrodes of the index finger covering. In some examples, at least one of the electrodes may be mounted into a cuff that is positioned over at least one finger.

In some examples, multiple additional electrodes may be implemented to allow users to input gestures to the artificial reality device. In some examples, multiple electrodes may be arranged in a pattern adjacent to each other forming a grid of electrodes. As such, when an opposing electrode comes into proximity with the grid of electrodes, a grid position may be determined indicating the location of the opposing electrode relative to the grid of electrodes.

In some examples, the above-described method may be encoded as computer-readable instructions on a computer-readable medium. For example, a computer-readable medium may include one or more computer-executable instructions that, when executed by at least one processor of a computing device, may cause the computing device to detect an amount of electrical charge at at least one electrode among at least two electrodes that are communicatively coupled to an artificial reality device, determine, based on the detected amount of electrical charge at the at least one electrode, a mutual capacitance measurement that indicates an amount of mutual capacitance between the at least two electrodes, determine, based on the determined mutual capacitance measurement, a relative proximity status between the at least two electrodes, where the relative proximity status indicates a degree to which the electrodes are in proximity with each other, and provide the determined relative proximity status between the at least two electrodes as an input to the artificial reality device.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
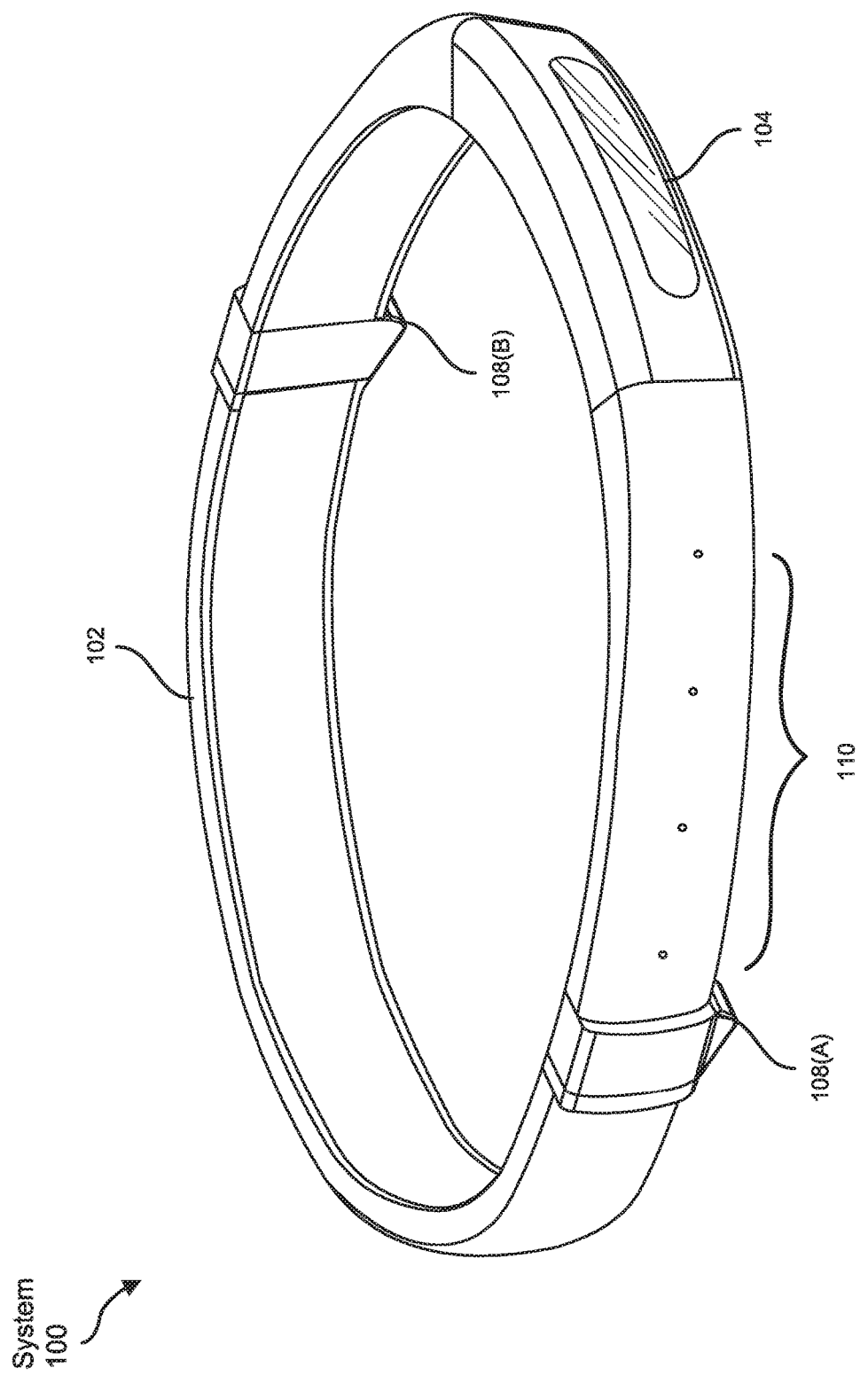
FIG. 1 illustrates an embodiment of an artificial reality headset.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to determining a proximity status between electrodes. As will be explained in greater detail below, embodiments of the instant disclosure may allow a controller or other computing system to determine when electrodes are close to each other, when they are touching, and when they have separated. Precisely determining when electrodes touch may have a large impact on an artificial reality system's ability to provide an immersive experience. For example, if a user is using an artificial reality device (e.g., an augmented reality headset or a virtual reality headset and/or gloves with haptic feedback), it may be frustrating to that user if the artificial reality device does not properly detect when the user's fingers are touching.

For instance, in some cases, a haptic glove configured to provide haptic feedback to a user may include electrodes dispersed throughout the glove. In some cases, for example, the haptic glove may include an electrode that is placed over the user's thumb and an electrode that is placed on the user's pointer fingertip. When the user pinches the pointer finger and thumb together, the two electrodes will come closer and closer until they touch. Through tactile sensations (apart from the haptic glove), the user will know when their pointer finger and thumb are touching. If the haptic glove does not register a touch when the user knows the finger and thumb are, in fact, touching, the user's brain will register the discrepancy. This may cause the user to be removed from an otherwise immersive experience. Similarly, if the user's fingers are subsequently moved apart from one another and the haptic systems does not register the movement, the user may get frustrated, noting that yet another movement did not register properly. Over time, the lack of accuracy regarding finger touches may lead the user to stop using the haptic glove and/or the artificial reality system altogether.

Accordingly, the embodiments herein may provide a more accurate and precise method of determining when electrodes are touching. Other embodiments may determine when electrodes are close to touching, but not touching. Still other embodiments may determine when electrodes that were previously touching have come apart. Each of these moments (near touching, touching, and separation) may be registered separately by the haptic system. Each separate moment may then be used to control aspects within the artificial reality device including interacting with user interfaces, interacting with virtual objects, interacting with other users, interacting with other devices, and so on. Still further, at least some of the embodiments herein may implement haptic feedback actuators to both provide haptic feedback and detect proximity of the electrodes. As such, haptic gloves or other haptic bodywear that implements the embodiments herein may have fewer components and less weight, making the gloves more desirable to wear on a long-term basis. These embodiments will be explained further below with regard to the artificial reality systems 100, 200 and 300 of FIGS. 1-3, and with further regard to FIGS. 4-14B.

Artificial reality systems may be implemented in a variety of different form factors and configurations. Some artificial reality systems may be designed to work without near-eye displays (NEDs), an example of which is AR system 100 in FIG. 1. AR systems that work without NEDs may take a variety of forms, such as head bands, hats, hair bands, belts, watches, wrist bands, ankle bands, rings, neckbands, necklaces, chest bands, eyewear frames, and/or any other suitable type or form of apparatus. Other artificial reality systems may be designed to work with an NED that may provide visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. AR system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

Figure 2:
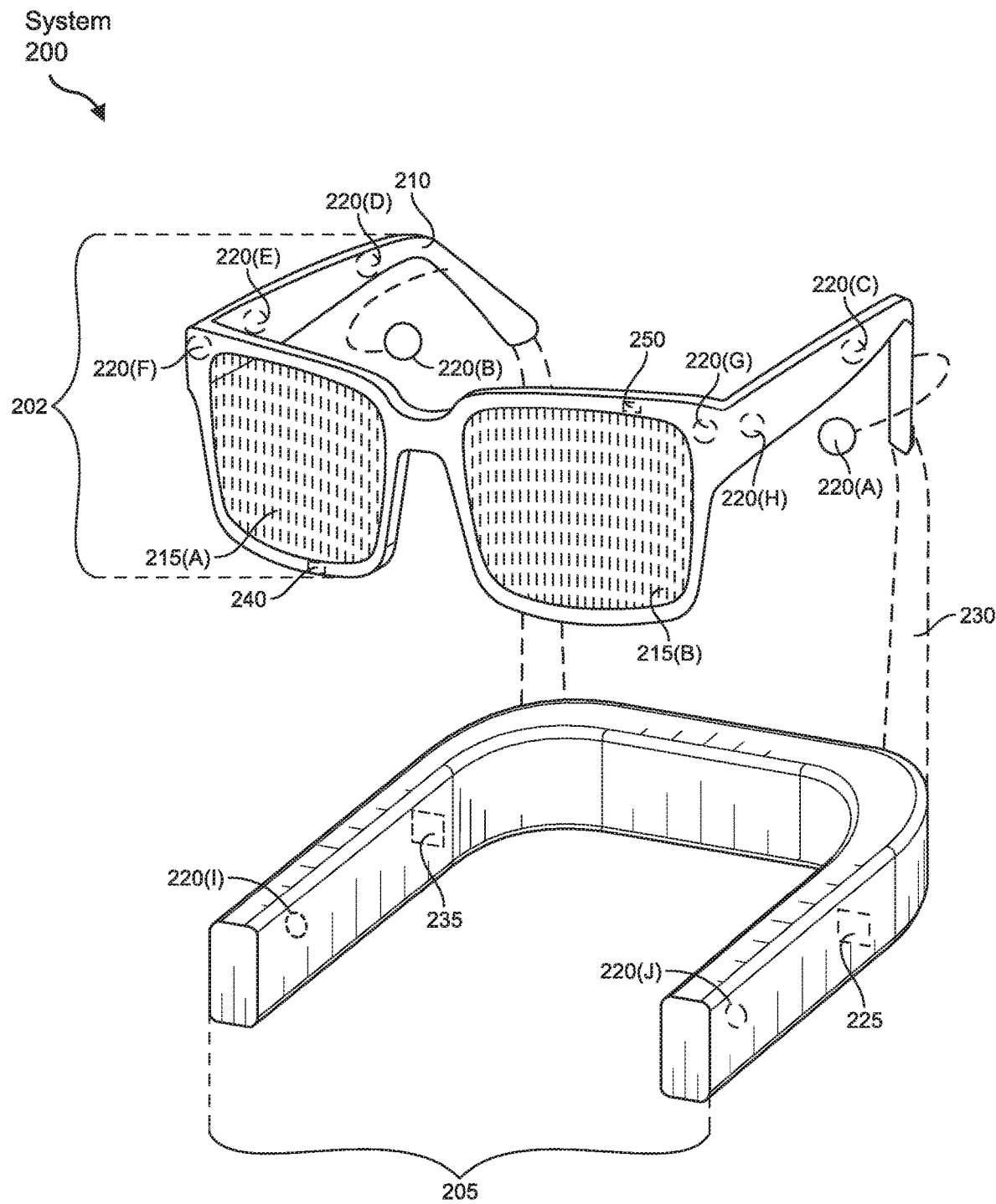
FIG. 2 illustrates an embodiment of an augmented reality headset and corresponding neckband.

The embodiments discussed in this disclosure may also be implemented in AR systems that include one or more NEDs. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. Examples of sensor 240 may include, without limitation, accelerometers, gyroscopes, magnetometers, other suitable types of sensors that detect motion, sensors used for error correction of the IMU, or some combination thereof. AR system 200 may also include a microphone array with a plurality of acoustic sensors 220(A)-220(J), referred to collectively as acoustic sensors 220.

AR system 200 may further include or be connected to an external device. (e.g., a paired device), such as neckband 205. As shown, neckband 205 may be coupled to eyewear device 202 via one or more connectors 230. The connectors 230 may be wired or wireless connectors and may include electrical and/or non-electrical (e.g., structural) components. In some cases, the eyewear device 202 and the neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of the eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, gloves, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality. Neckband 205 may also include a controller 225 and a power source 235. Moreover, the neckband may include one or more transducers configured to provide haptic feedback to the user. The haptic feedback may include pulses, vibrations, buzzing or other sensations that communicate information to a user.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more inertial measurement units (IMUS), one or more tracking emitters or detectors, and/or any other suitable device or system for creating an artificial reality experience.

Figure 3:
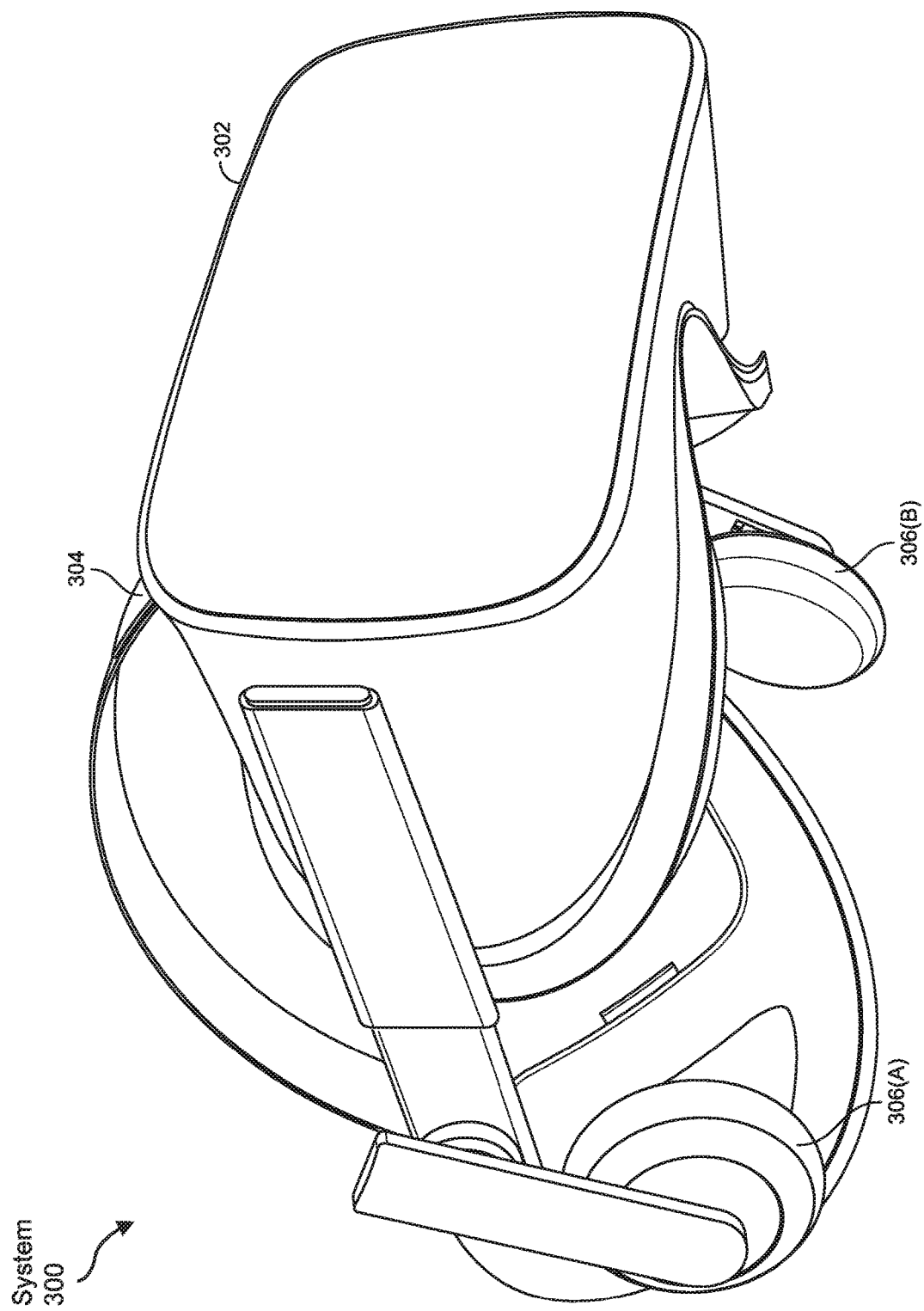
FIG. 3 illustrates an embodiment of a virtual reality headset.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Figure 4:
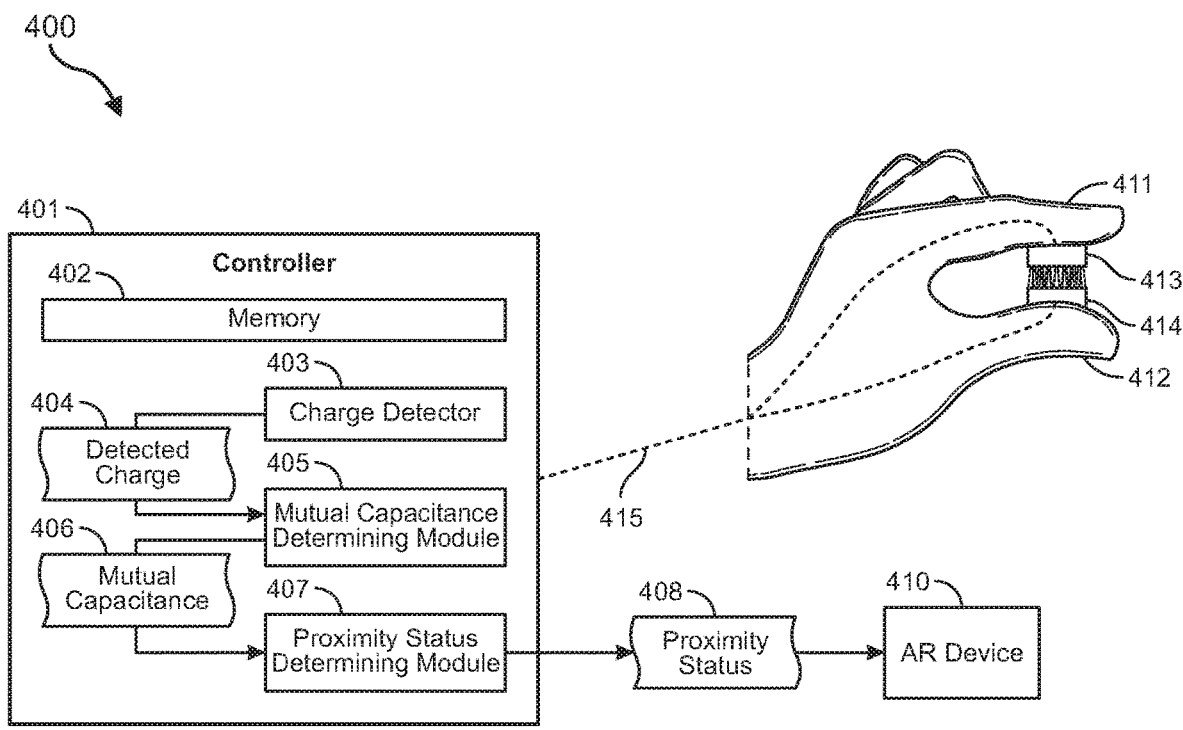
FIG. 4 illustrates an embodiment of a proximity detection system that includes at least two electrodes.

FIG. 4 illustrates an example artificial reality system 400. The artificial reality system 400 may include a controller 401, two (or more) electrodes 413 and 414, and an artificial reality device 410. The artificial reality device 410 may include any or all of the devices 100, 200, or 300 described above with regard to FIG. 1, 2, or 3, including augmented reality headsets, virtual reality headsets or other artificial reality devices. The artificial reality device 410 may be communicatively connected to the controller 401 and/or the electrodes 413/414. It will be understood that, in many of the embodiments herein, the electrodes may be shown and described as being embedded in or part of a glove. The electrodes 413/414 may, however, be part of or incorporated into substantially any type of haptic feedback device designed for use anywhere on a user's body. Moreover, when examples containing one or two electrodes are referred to herein, it will be understood that substantially any number of electrodes may be used in any given implementation.

The electrodes 413/414 may be made of copper, zinc, silver, gold, platinum or other conductive metals or other conductive materials such as silicon. At least in some cases, the electrodes 413/414 may include insulators. For instance, the electrodes 413/414 may be embedded in a glove, where electrode 413 is embedded on the glove fingertip of the user's pointer finger 411, and the electrode 414 is embedded on the pad of the thumb 412. When the insulators on each electrode contact each other, the electrodes may be said to be touching. In some embodiments, the electrode insulators may be made of enamel, silicone, plastic, or other insulating substance.

Each electrode may be linked to the controller 401 via a wire 415. The controller 401 may be any type of electronic hardware configured to receive and process electrical inputs, including a Field-Programmable Gate Arrays (FPGA), an Application-Specific Integrated Circuit (ASIC), an Electrically-Erasable Programmable Read-Only Memory (EEPROM), a system-on-a-chip, or some other type of computing hardware. The controller 401 may receive electrical inputs from the electrodes 413/414 via the conductive wire 415. The controller 401 may also include a memory 402 which may be configured to store software code or other instructions indicating how the controller is to process the electrical inputs. At least in some embodiments, the controller 401 may include modules that perform one or more of the computational steps. These modules may perform their functions solely in hardware, solely in software, using a combination of both hardware and software.

For example, the charge detector 403 may be configured to detect an electrical charge received from one or more of the electrodes 413/414. For instance, the electrodes may be placed a given distance apart by a user. As the electrodes 413/414 get closer, each electrode may begin to accumulate an electrical charge. Indeed, the two electrodes, along with an area of air that exists between the electrodes, may form a capacitor where air acts as the dielectric. When powered by a power supply (e.g., in neckband 205 of FIG. 2), the electrodes 413/414 may build up an electrical charge that is measurable by the charge detector 403. The charge detector 403 may detect the built-up charge at any of the electrodes individually or may determine the amount of charge at a group of electrodes collectively.

Once the charge detector 403 has detected at least some amount of electrical charge, the detected amount of charge 404 may be provided as an input to the mutual capacitance determining module 405. The mutual capacitance determining module 405 may analyze the detected charge 404 at one electrode (e.g., 413) or at both electrodes (e.g., 413/414) and may calculate a mutual capacitance measurement 406. The mutual capacitance measurement 406 may indicate the amount of capacitance (e.g., in analog-to-digital (ADC) counts or in some other form of measurement) that exists between the two electrodes 413/414. This amount of mutual capacitance may change as the distance between the electrodes 413/414 decreases or increases. For instance, the amount of mutual capacitance between the electrodes 413/414 may increase as the amount of dielectric material (air in this example) decreases.

This mutual capacitance measurement 406 may then be provided as an input to the proximity status determining module 407. The proximity status determining module 407 may use the mutual capacitance measurement 406 to calculate a relative proximity status 408 between the electrodes 413/414. This relative proximity status 408 may indicate how close or far apart the electrodes are from each other (e.g., as measured in millimeters). As the electrodes 413/414 come closer toward each other, for example, the amount of air between them acting as a dielectric will continue to decrease until there is no air between them and the electrodes are touching. The controller 401 may then determine that the electrodes 413/414 are touching and may indicate such to the artificial reality device 410. This information may be provided to the AR device 410 to provide precisely-timed haptic feedback, thereby fully immersing the user in the artificial reality experience. This process will be described in greater detail below with regard to method 500 of FIG. 5 and with regard to the embodiments depicted in FIGS. 6A-14B.

Figure 5:
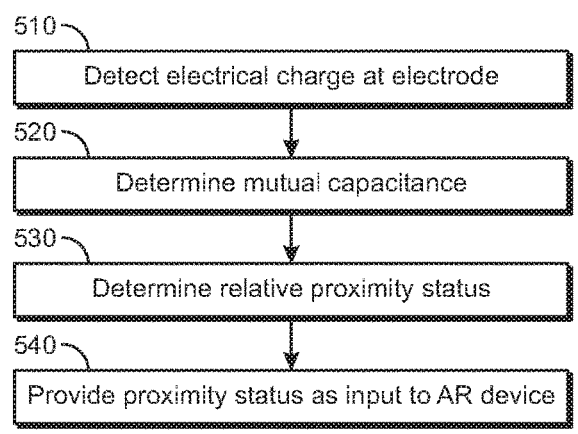
FIG. 5 illustrates a flow diagram of an exemplary method for determining a proximity status between electrodes.

FIG. 5 illustrates a flow diagram of an exemplary computer- or controller-implemented method 500 for determining a proximity status between electrodes. The steps shown in FIG. 5 may be performed by any suitable computer-executable code and/or computing system, including the system illustrated in FIG. 4. In one example, each of the steps shown in FIG. 5 may represent an algorithm whose structure includes and/or is represented by multiple sub-steps, examples of which will be provided in greater detail below.

As illustrated in FIG. 5, at step 510 one or more of the systems described herein may detect an amount of electrical charge at at least one electrode among at least two electrodes that are communicatively coupled to an artificial reality device. For example, the charge detector 403 of controller 401 may detect an amount of electrical charge at electrode 413 and/or electrode 414. Each of these electrodes may be connected to the controller via a single wire (e.g., 415) or via separate wires.

Method 500 may next include determining, based on the detected amount of electrical charge 404 at the at least one electrode, a mutual capacitance measurement 406 that indicates an amount of mutual capacitance between the at least two electrodes (step 520). For instance, the mutual capacitance determining module 405 may determine a mutual capacitance measurement 406 based on the detected amount of charge 404 in the electrodes 413/414. As opposed to traditional systems that measure galvanic connections between electrodes, which process is prone to malfunctions caused by oil and dirt, the mutual capacitance determining module 405 may be configured to determine a measure of capacitance between the electrodes. The mutual capacitance measurement 406 may provide more than a touch or no-touch signal. Indeed, the mutual capacitance measurement 406 may detect electrodes that are close but not touching (e.g., within 2 mm). Moreover, the mutual capacitance determining module 405 may be configured to measure the distance between the electrodes before they touch. In some embodiments, for example, the charge detector 403, mutual capacitance determining module 405, and/or the proximity status determining module 407 may be determined to function on a continuous or continual, repeating basis. Thus, the amount of charge detected at the electrodes may be updated each second, each millisecond, each microsecond, or at some other period to continually update the measurement of the distance between the electrodes 413/414.

In some embodiments, the mutual capacitance determining module 405 may be configured to measure capacitance between two electrodes (e.g., 413/414). In such cases, neither electrode may be electrically grounded. Alternatively, the mutual capacitance determining module 405 may be configured to measure the capacitance between a single electrode (e.g., 413) and ground. This latter measurement may be distinguished from a mutual capacitance measurement in that it may recognize when two electrodes have touched but may not know which electrodes have touched. On the contrary, the mutual capacitance measurement 406 may determine when two electrodes have touched and may determine which two electrodes touched. At least in some embodiments, mutual capacitance may also be more tolerant to parasitic capacitances lost to ground and may thus more easily allow conductors (e.g., wire 415) to be routed through the system without substantial loss of signal. In still further embodiments, the mutual capacitance determining module 405 may be configured to measure mutual capacitance between two electrodes (e.g., 413/414) when one electrode is grounded, as described in related U.S. Pat. No. 9,109,939.

In cases where each fingertip includes an electrode, for example, the user may touch their thumb to any of the electrodes in the other fingers of the user's hand. In other cases, the user may touch their thumb or other fingers to fingers on the user's other hand, or even potentially on another user's hand. In such cases, mutual capacitance measurements using signals from each individual electrode may be used to identify which electrodes were touched. Mutual capacitance measurements may also allow the controller 401 to determine whether the electrodes are close or touching even when the each of the electrodes are moving (e.g., relative to the user). Indeed, in the embodiments herein, none of the electrodes needs to be fixed or immobile.

Any of the electrodes may be mobile relative to each other or relative to the user and, at least in some cases, may move while mutual capacitance is being detected.

Method 500 of FIG. 5 may next include determining, based on the mutual capacitance measurement 406, a relative proximity status 408 between the at least two electrodes (e.g., 413/414) at step 530. The relative proximity status 408 may indicate a degree to which the electrodes 413/414 are in proximity with each other. The controller 401 may then provide the determined relative proximity status 408 between the at least two electrodes 413/414 as an input to the artificial reality device 410 at step 540. The relative proximity status 408 may indicate the distance between two electrodes at any given point in time.

Figure 6A:
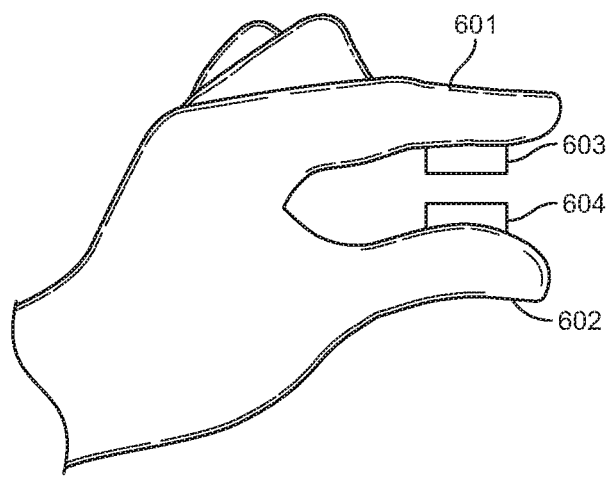
FIGS. 6A-6C illustrate progressive embodiments in which electrodes are moved together and are subsequently moved apart.
Figure 6B:
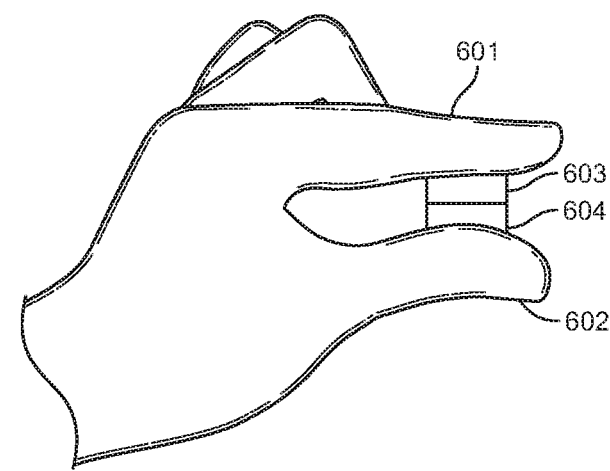
Figure 6C:
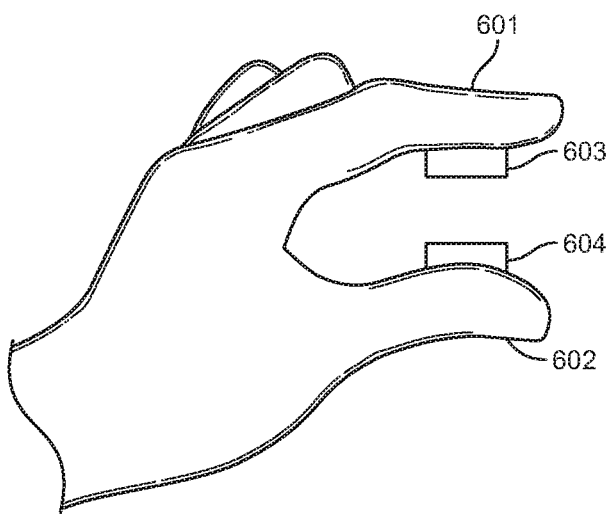

For example, as shown in FIGS. 6A-6C, two electrodes 603 and 604 may be moved to many different positions relative to each other. In each position, the controller 401 of FIG. 4 may register a different detected charge 404 and may thus calculate a different mutual capacitance 406 and a different resulting proximity status 408. The proximity status 408 may therefore change as the electrodes 603 and 604 of FIG. 6 are moved toward each other and away from each other. In FIG. 6A, for example, the electrodes 603/604 may be positioned within a short enough distance that a mutual capacitance may be measured relative to the two electrodes (this distance may vary depending on the size of the electrodes, the chemical composition of the electrodes, or other environmental factors such as those that would affect the dielectric).

In FIG. 6B, the electrodes 603/604 may be moved to within touching distance. In FIG. 6C, the finger 601 and thumb 602 may be moved far enough apart that the controller no longer registers a mutual capacitance (i.e., the electrical charges 404 at the electrodes are small enough that the mutual capacitance between the electrodes 603/604 is negligible). Accordingly, the controller may detect not only when the electrodes 603/604 are touching, but also when the electrodes have stopped touching. Moreover, after the electrodes are sufficiently close to create a capacitive effect between them, the controller may determine the relative distance between the two electrodes 603/604. This may be true even if both of the electrodes are moving relative to the user (e.g., the user is waving their hand).

Accordingly, the controller 401 may be configured to determine a mutual capacitance measurement 406 based on an amount of electrical charge detected at at least one electrode (e.g., 603) and may also determine a mutual capacitance measurement 406 based on an amount of electrical charge detected at two different electrodes (e.g., 603/604). Using this mutual capacitance measurement 406, the controller 401 may determine when the two electrodes are touching each other. In cases where a haptic glove, body suit, or other piece of haptic equipment includes multiple different electrodes, the controller 401 may not only determine that two electrodes are touching but may also determine which two electrodes are touching.

Figure 7A:
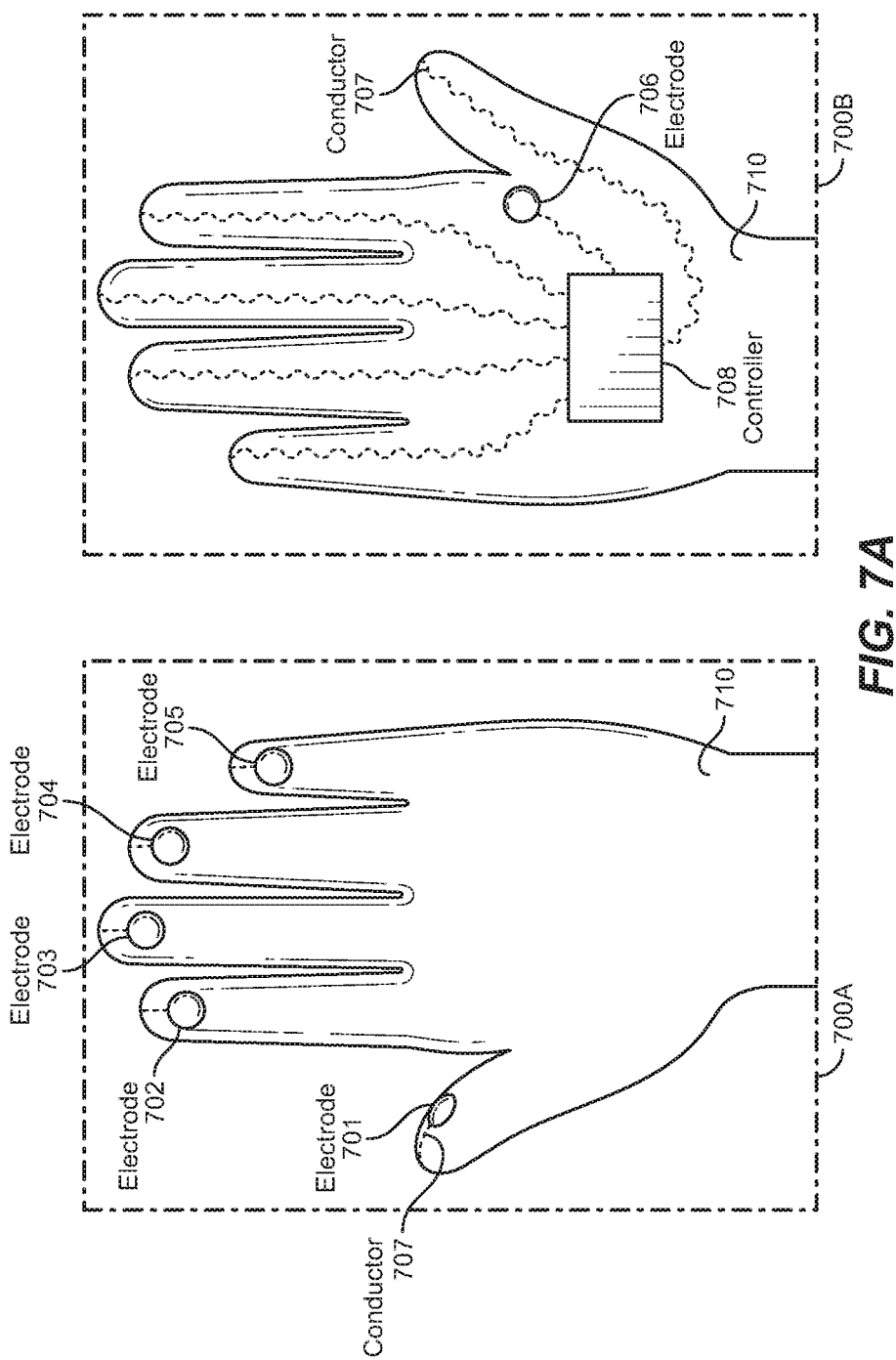
FIG. 7A illustrates an embodiment of a proximity detection system.

For example, as shown in FIG. 7A, the left-side box 700A illustrates the palm side of a user's hand with a glove 710. The glove may include a plurality of embedded electrodes 701-705. The electrodes 701-705 may be embedded, for example, in the fingertips of each finger on the glove. As in the embodiments shown in FIG. 6A-6C, the user may touch their thumb, for example, to any of their fingers. Thus, when electrode 701 on the thumb touches electrode 702 on the pointer finger or touches electrode 703 on the middle finger or touches electrode 704 on the ring finger or touches electrode 705 on the pinky finger, the controller 708 may be able to determine when the respective electrodes are close, touching or separated. The back side of the user's hand, shown in the right-side box 700B, may include one or more conducting wires 707 that connect each electrode to the controller 708. Still further, the back-side of the user's hand may include other electrodes, for example, positioned between the user's thumb and pointer finger (e.g., electrode 706 (which may be a reference electrode, as explained further below)). Many other electrodes may be embedded on the haptic glove 710 in addition to electrodes 701-706.

In some embodiments, the haptic glove 710 may be constructed from a power mesh. The electrodes 701-706 may be integrated into this power mesh. The power mesh may be a type of fabric mesh made of nylon, spandex, or other material that is designed to stretch. Haptic gloves constructed of such material may be more comfortable to a variety of users as the gloves may stretch to accommodate substantially any shape or size of hand. In FIG. 7A, electrodes are located at each fingertip and at the thumb tip. Each electrode may be connected to the controller 708 (e.g., a printed circuit board (PCB)) using one or more conductors 707.

In some cases, the conductors 707 may include enameled wire. In some embodiments, this wire may be 30-guage or smaller in diameter, and in other embodiments, the wire may be 34-guage or smaller. Smaller wire may be more flexible and thus more comfortable for the user to wear. In some embodiments, the conductors 707 may comprise silicone-jacketed, 30-guage (or smaller) stranded wire. The conductors 707 may be insulated to avoid unintended electrical connection. Alternatively, the conductors 707 may be non-insulated such as, for example, conductive thread. The electrodes 701-706 may be insulated using various materials to shield the electrodes from the user's body and from other conductors to avoid measurement errors. In some embodiments, the conductors 707 may be attached to the haptic glove 710 in a serpentine pattern so that the conductors are free to move and conform to the user's hand. Alternatively, flexible conductors may be implemented in the haptic glove 710. Such flexible conductors may be attached to the haptic glove 710, for example, by stitching across the conductors using thread.

When operating (e.g., when connected to an artificial reality headset or other artificial reality system (e.g., any of 100, 200 or 300 from FIG. 1, 2, or 3, respectively)), the controller 708 may drive a signal on one electrode and detect the effect on a second electrode. The first electrode may be referred to as a transmit electrode (TX), and the second electrode may be referred to as a receive electrode (RX). The TX electrode may be driven at a relatively low impedance and the RX electrode may form a high impedance input to a sensing circuit (e.g., controller 708). As a result, in at least some embodiments, any parasitic capacitance between TX electrodes may be neglected. On the flipside, any parasitic capacitance between TX and RX electrodes may be reduced by maintaining a minimum spacing of at least 5 mm, for example, between TX conductors and RX conductors. In some embodiments, electrodes 701 and 706 may be RX electrodes and electrodes 702, 703, 704, and 705 may be TX electrodes. By placing the controller 708 on the back of the hand and by routing the conductors 707 over the backs of the fingers, an optimal spacing for TX and RX electrodes may be provided.

Additionally or alternatively, each RX conductor may be shielded using a shielding material to reduce coupling to TX conductors. Alternatively, each TX conductor may be shielded, or both RX and TX conductors may be shielded. The shielding may, for example, encircle each of the conductors 707. In other cases, shield wires may be routed adjacent to the shielded conductor (e.g., within 1 mm). The shield may be connected to system ground or may be driven to match the shielded conductor. The controller 708 may thus drive a single TX electrode and may then measure the received signal on one or more RX electrodes. In this manner, measurements across TX and RX electrodes may be time multiplexed within the system. To assist in the measurement process, electrode 706 may be implemented as a reference electrode. In some cases, portions of a signal may couple from a TX electrode, through the user's body, to an RX electrode. The reference electrode (e.g., 706) may be used to correct for this coupling that occurs through the user's body. The reference electrode may be place in a location on the glove (or other haptic device) where it is unlikely that another electrode will touch it. In some embodiments, the reference electrode 706 may be a TX electrode and in other cases, the reference electrode 706 may be an RX electrode.

In some embodiments, it may be advantageous to limit the number of RX electrodes because the RX electrodes are designed to supply a high impedance and, as a result, their conductors may be more difficult to route as they are more susceptible to parasitic coupling to TX conductors. In such cases, the glove 710 may include fewer RX electrodes than TX electrodes. Conductors (e.g., 707) may also be routed to avoid sharp bend areas such as the palm side of the base of the fingers. Such routing may limit sharp bends on the conductors, potentially avoiding premature failures. Routing the conductors in this manner may also improve user comfort while wearing the glove 710. The electrodes 701-706 and/or the controller 708 may be mounted to an embroidered patch on the glove 710, as will be explained further below.

Thus, a haptic glove such as 710 may include many different electrodes arranged in a variety of different locations. The controller 708 may receive inputs from RX electrodes indicating charge levels at those electrodes. From this charge, the controller 708 may determine a mutual capacitance measurement between any two of the electrodes that are close enough to begin generating a measurable mutual capacitance. The controller may determine which two electrodes are within a specified distance of each other and may determine what that distance is. Moreover, the controller 708 may determine when the electrodes are touching, how long they are touching, and when the two electrodes separate from each other, all using the mutual capacitance measurement. Each of these moments may be used in a user interface to control interactions with that user interface and/or interactions with virtual objects.

In some embodiments, one or more of the electrodes 701-706 may be a transducer that is configured to provide a tangible movement upon receiving a triggering input. These transducers may be the elements in a haptic glove that provide the haptic feedback. The transducers may receive an input signal from the controller 708 or from another controller (e.g., a controller within an artificial reality headset such as 300 of FIG. 3) and may produce a movement such as a buzz or a vibration that may be felt by the user. In some embodiments, these transducers may be implemented as electrodes 701-706 in the haptic glove 710.

One example of such transducers or actuators is a vibrotactor. A vibrotactor may be a flexible piezo material that vibrates upon receiving an input drive signal. For instance, the controller 708 may apply a sine wave input signal (e.g., at 200V) and the vibrotactor may flex in proportion to the amount of voltage applied across the piezo element. Vibrotactors may be small and may conforms well to the user's fingers. Each vibrotactor may have a conductor which may be used as capacitive plate. The embodiments herein may temporarily disconnect the existing piezo drive system and apply a higher frequency signal to perform the capacitive coupling. Indeed, at least in some embodiments, the higher-frequency signal applied to the vibrotactor may cause the buildup of electrical charge at the conductor that is used as a capacitive plate.

The controller 708 may, for example, send a TX signal to the vibrotactor which causes the vibrotactor to vibrate. In some embodiments, that signal may be at a frequency of around 100 Hz. In between such TX signals, or before or after such signals, the controller 708 may send a higher-frequency signal to the vibrotactor to detect the electrical charge buildup (e.g., electrical charge 404 of FIG. 4). This higher frequency signal (e.g., in the KHz or MHz range) may not be reproduced by the vibrotactor or, if the vibrotactor is capable of reproducing the signal, the signal may not be felt by the user. As such, detecting electrical charge 404 (and therefore mutual capacitance) may be performed at a higher frequency, while haptic feedback actuations may be performed at a lower frequency. Thus, the same transducer (e.g., a vibrotactor) may be used as both an electrode and an actuator.

Figure 7B:
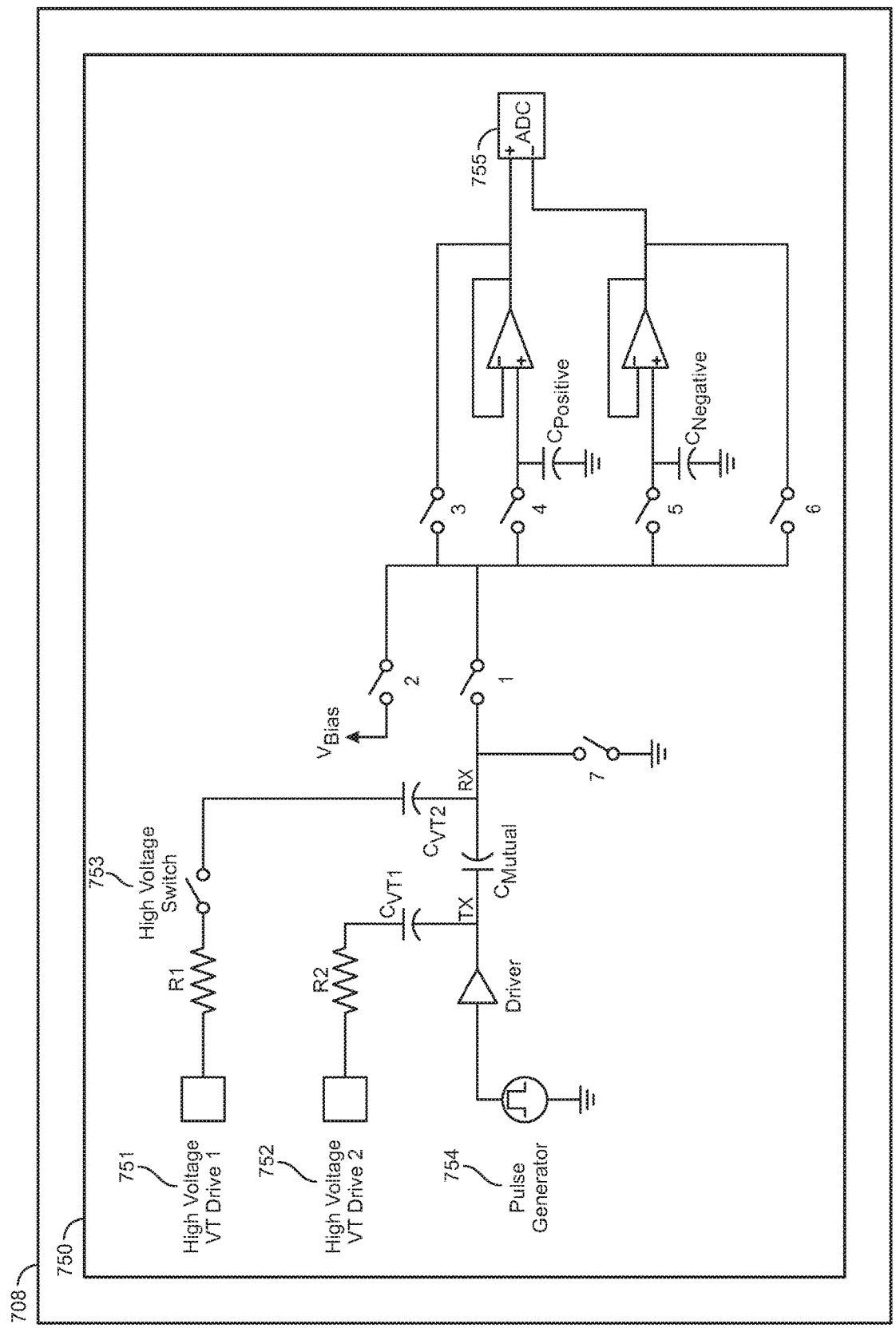
FIG. 7B illustrates an example circuit diagram for a circuit that may be included in the proximity detection system.

For example, FIG. 7B illustrates one embodiment of a circuit diagram 750 that may be implemented in or accessed by the controller 708 of FIG. 7A. In some embodiments, the circuit diagram 750 may provide drive signals for vibrotactors (VTs). For instance, VT drive 1 (VT1 751) may drive a first vibrotactor and VT drive 2 (VT2 752) may drive a second vibrotactor. In some cases, VT1 may be the transmitter and VT2 may be the receiver. Both VTs may be driven by high voltage VT drives (751/752) through series resistors R1 and R2 (e.g., at 1k ohms each). During measurements, the positive terminal of VT2 may be disconnected from the VT drive 752 by opening a high-voltage switch 753. The negative terminal may be disconnected from ground by opening switch 7. In such cases, VT2 would now be a high-impedance receiver (RX).

The negative terminal of VT1 may be connected to a high-current logic driver that outputs specified voltages (e.g., 0V or 5V). The driver may have sufficiently low impedance to overcome the current through R2. The driver may be controlled by a pulse generator 754. The pulses may be, for example, 1.7 uS wide with 10 pulses in a sequence. Sequence duration may be, for example, 34.5 uS and may repeat every 10 mS, for example (i.e., 0.4% duty cycle). At least in some cases, the vibrotactor response time may be too slow to react to pulses of this speed and, as such, the pulses may be implemented in a manner that will not degrade the vibrotactor user experience. Vibrotactor 1 may now be a low-impedance transmitter (TX). At least in some embodiments, the measurements may occur relatively quickly as VT2 is disconnected from the high-voltage drive. When gathering data for machine learning estimation of hand pose, each RX VT may be measured relative to multiple transmitter vibrotactors. The receiver vibrotactors may experience some amount of distortion, when operating as a vibrotactor, if the measurement window is overly long.

"Cmutual" in the example circuit diagram 750 of FIG. 7B may refer to the mutual capacitance between VT1 and VT2. This may be the same as mutual capacitance measurement 406 of FIG. 4. In some embodiments, Cmutual may be between ½ pF and 5 pF. At least in some embodiments, the controller 708 may have built-in hardware to measure mutual capacitance. For example, some controllers may implement a current digital-to-analog converter (DAC) and timer to measure charge transferred to accumulator capacitors. The embodiments herein may be configured to make a voltage-based measurement to more easily observe the circuit on an oscilloscope.

In one embodiments, at the start of a measurement, the high-voltage switch 73 and switch 7 are opened. These switches may remain open throughout the measurement. The following steps may be repeated multiple times (e.g., 10 times in some cases): 1) Close switches 2, 4, and 5. This may apply the same bias voltage on Cpositive and Cnegative so the differential measurement between them starts at zero. The bias voltage may be ½ Vcc and may be a virtual ground. At least in some embodiments, the voltage used may vary since the ADC 755 may measure differentially between Cpositive and Cnegative. 2) Close switch 1 and 3. The receiver (RX) may have parasitic capacitance to ground. Closing these switches may charge the parasitic capacitance to the voltage on Cpositive. 3) Open all switches, which may make RX high impedance. 4) Drive TX high. The coupling through Cmutual may increase the voltage at RX following the increase in TX. 5) Close switches 1 and 4. This may increase the voltage on Cpositive, and the increase may be proportional to Cmutual. 6) Close switches 1 and 6. This may charge the RX parasitic capacitance to the voltage on Cnegative. 7) Open all switches. This may make RX high impedance. 8) Drive TX low. The coupling through Cmutual may decrease the voltage at RX following the decrease in TX. 9) Close switches 1 and 5. This may decrease the voltage on Cnegative, and the decrease may be proportional to Cmutual. At the end of this sequence, the controller 708 may measure the differential voltage between Cpositive and Cnegative. This measurement may be proportional to Cmutual. Accordingly, this process may allow a vibrotactor (or other transducer) to act as a haptic feedback provider and as a mutual-capacitance sensor.

Within this dual-purpose detector and haptic feedback provider functionality, substantially any type of transducer may be used. For example, voice coil transducers, linear resonant actuators (LRAs), electrically-activated jammers, fluidic actuators, or other types of actuators may be used. In some cases, substantially any actuator having a sufficient amount of conductor area may be configured to act like an electrode and a transducer simultaneously (or at least within close succession). Accordingly, when any two transducers (e.g., vibrotactors) are brought together (as in FIG. 6B), they may become one through mutual capacitance, and this mutual capacitance may be detected and used to provide haptic feedback such as vibrations or buzzes. The controller may send control signals to the transducer to provide the haptic feedback and may immediately thereafter provide one or more charge detection signals to detect charge at the transducers (which in this case are also acting as electrodes). By implementing haptic feedback transducers as electrodes, each haptic glove or other haptic device may not need to include both electrodes and separate transducers. As such, the haptic glove may be lighter and thus more comfortable to wear. Moreover, instead of having to run separate wires to both electrodes and transducers, haptic devices using the embodiments herein may implement a single wire to each combined transducer/electrode.

Thus, in this manner, any of the electrodes 701-706 shown in FIG. 7A may also function as transducers or actuators to provide haptic feedback to the user. The controller 708 may measure mutual capacitance before, after, or while the controller 708 provides haptic feedback inputs to the transducer/electrodes. The controller 708 may use the same wires to provide the haptic feedback control signals as were used to detect mutual capacitance. Moreover, the controller 708 may receive feedback from these electrodes before, after or while providing haptic feedback inputs. The controller 708 may then use the received feedback to calibrate other sensors communicatively coupled to the system.

For example, in some embodiments, one or more of the electrodes may be a stretch sensor. The stretch sensor may be configured to detect an amount of stretch in the artificial reality device (e.g., haptic glove 710). The controller 708 may detect the amount of stretch while determining the mutual capacitance measurement between the at least two electrodes. The controller 708 may use feedback received from the other electrodes (e.g., 701-706) to calibrate the stretch sensor. The stretch sensor, which may be made of a stretchable material such as conductive silicone, having an insulating layer sandwiched between two layers of conductive silicone, may generate a capacitance measurement as it is stretched out (e.g., on the back of a user's hand). This capacitance measurement may then be refined by measurements taken at the electrodes 701-706. Alternatively, feedback from the stretch sensor may be used to calibrate any one or more of the electrodes 701-705.

In some embodiments, these stretch sensors may also be used as electrodes. Indeed, as noted above, one or more stretch sensors may be placed on the back of a haptic glove to identify where the user's fingers bend. In other cases, the stretch sensors may stretch over the fingertips and onto the fingertips of the gloves, similar to the electrodes 701-705 shown in FIG. 7A. In such cases, the stretch sensors may be used as electrodes capable of detecting touch at the user's fingertips. Flexible piezo actuators may also be used as stretch sensors and/or electrodes in a similar manner.

Figure 8:
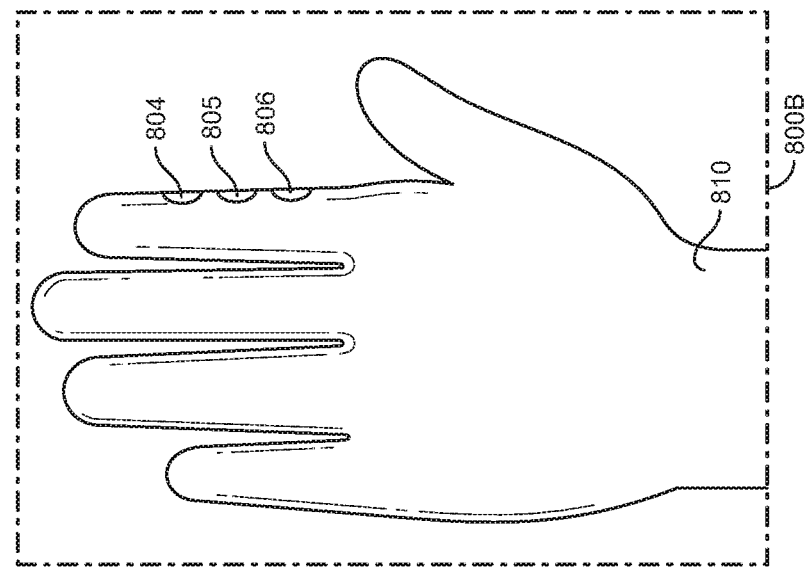
FIG. 8 illustrates an alternative embodiment of a proximity detection system embedded in at least a partial glove.
Figure 8:
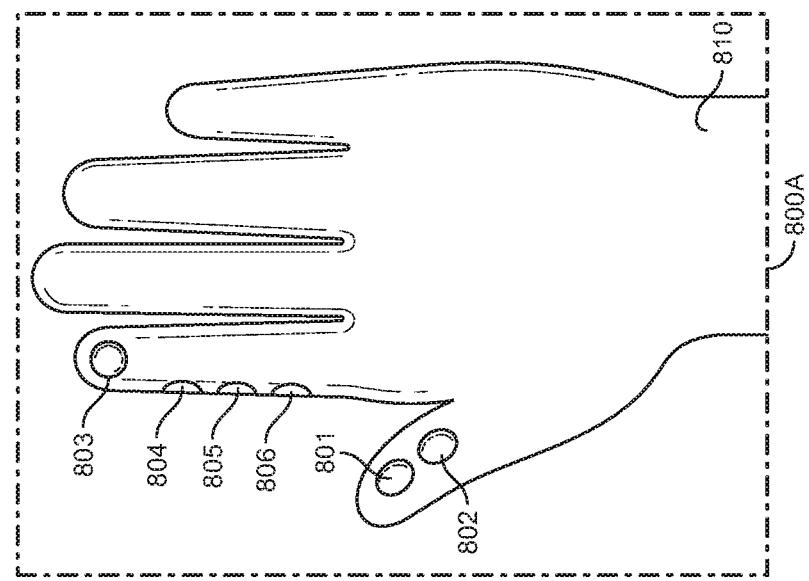

Turning now to FIG. 8, box 800A shows the front of a user's hand with a haptic glove 810. Box 800B shows the back of a user's hand with the same glove 810. As noted with other preceding figures, the embodiments herein may be implemented in a full glove (such as 810) or in a partial glove. The embodiments herein may also operate in footwear, bodywear, headwear or other haptic feedback systems. In glove 810 of FIG. 8, the thumb may have two RX electrodes (801 and 802). The index finger may have a TX fingertip electrode 803, as well as TX electrodes on the side of the finger facing the thumb (804, 805, and 806). The two thumb electrodes 801 and 802 may be configured to detect gestures. For instance, the two thumb electrodes 801 and 802 may be configured to detect a gesture of sliding the thumb perpendicular to the index finger, (e.g., a push or pull). As a single TX electrode (803-806) slides from 801 to 802, the detected charge on 801 may decrease as the detected charge on 802 increases. Thus, the artificial reality device and/or a communicatively-coupled controller may measure a granular position of the TX electrode as it slides across the thumb electrodes 801 and 802. Using this method, the user's fingers may act as a slider control as the fingers slide over the thumb electrodes.

Alternatively, the controller or artificial reality device may treat each charge measurement as a touch or no-touch measurement using a preestablished measurement threshold. In such cases, any charge measurement other than touching may be registered as a no-touch and only a touch is indicated as a touch. Then, based on the timing of the touch or no-touch measurements from the thumb electrodes 801/802, the controller may determine which direction a user is sliding their thumb relative to their finger (e.g., the pointer finger in the example shown in FIG. 8). In other examples, the electrodes may be placed on different fingers, but may function in the same or similar manner. The electrodes on the side of the user's finger may also be used to detect the thumb sliding parallel to the index finger or sliding relative to other fingers.

Figure 9:
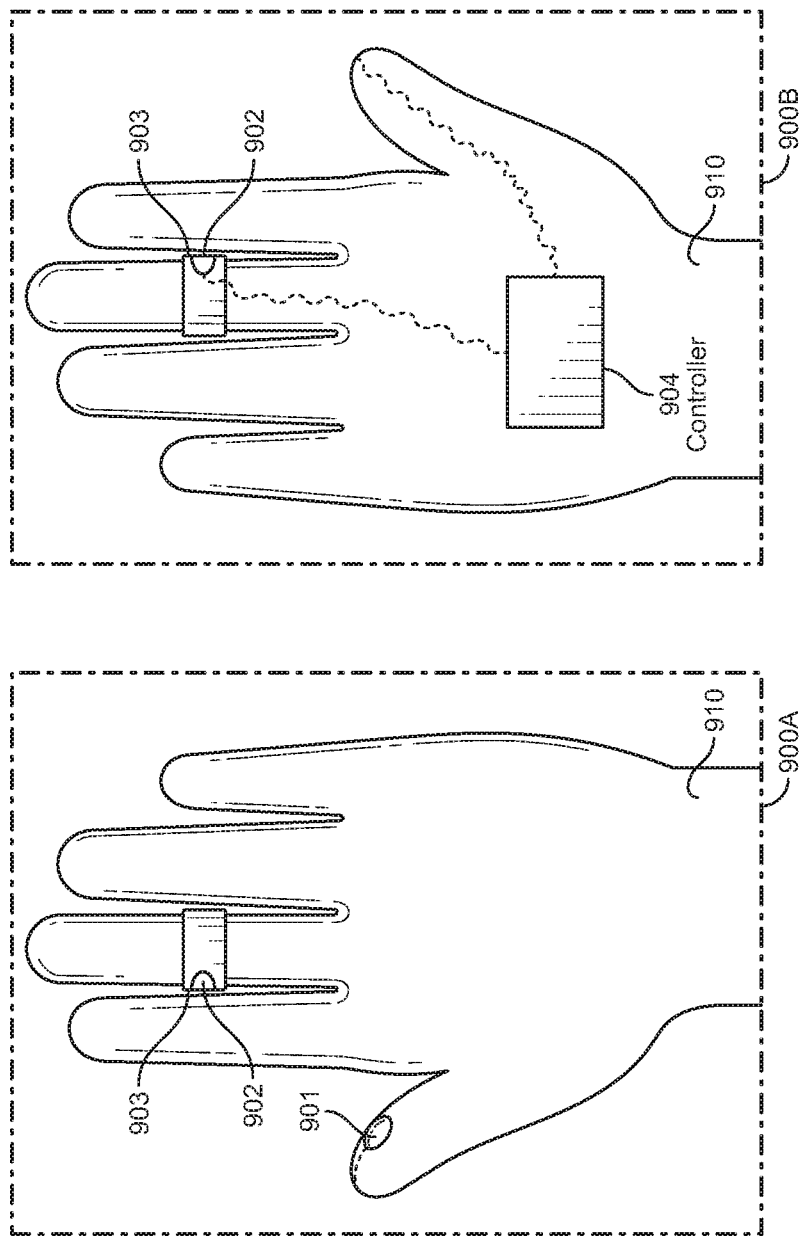
FIG. 9 illustrates an alternative embodiment of a proximity detection system embedded in at least a partial glove.

FIG. 9 illustrates an alternative glove embodiment in which an electrode is mounted on the side of the glove's thumb. Box 900A of FIG. 9 illustrates the palm side of a glove 910 that includes a cuff 903. The cuff may be made from a loop of non-conductive stretchable material and may be place over or attached to a finger (the middle finger in FIG. 9). The cuff may have an electrode 902 connected via a conductor to the controller 904, as shown in box 900B. This cuff may be repositioned anywhere along the finger, and the electrode 902 may be located at any rotation relative to the glove. In some embodiments, the cuff 903 may be sewn into the glove 910 once in position. The electrode 902 may be used to detect contact between the thumb and the side of the middle finger. Thus, a user may implement the thumb electrode 901 and the cuff electrode 902 to create a variety of gestures which may be used by the artificial reality device to control a user interface, to control artificial reality objects, or to perform other actions. In some cases, for example, the thumb electrode 901 and the cuff electrode 902 may be used to form a finger gun in an augmented or virtual world, perhaps when playing a game or acting a role in a VR murder mystery, for instance.

Figure 10:
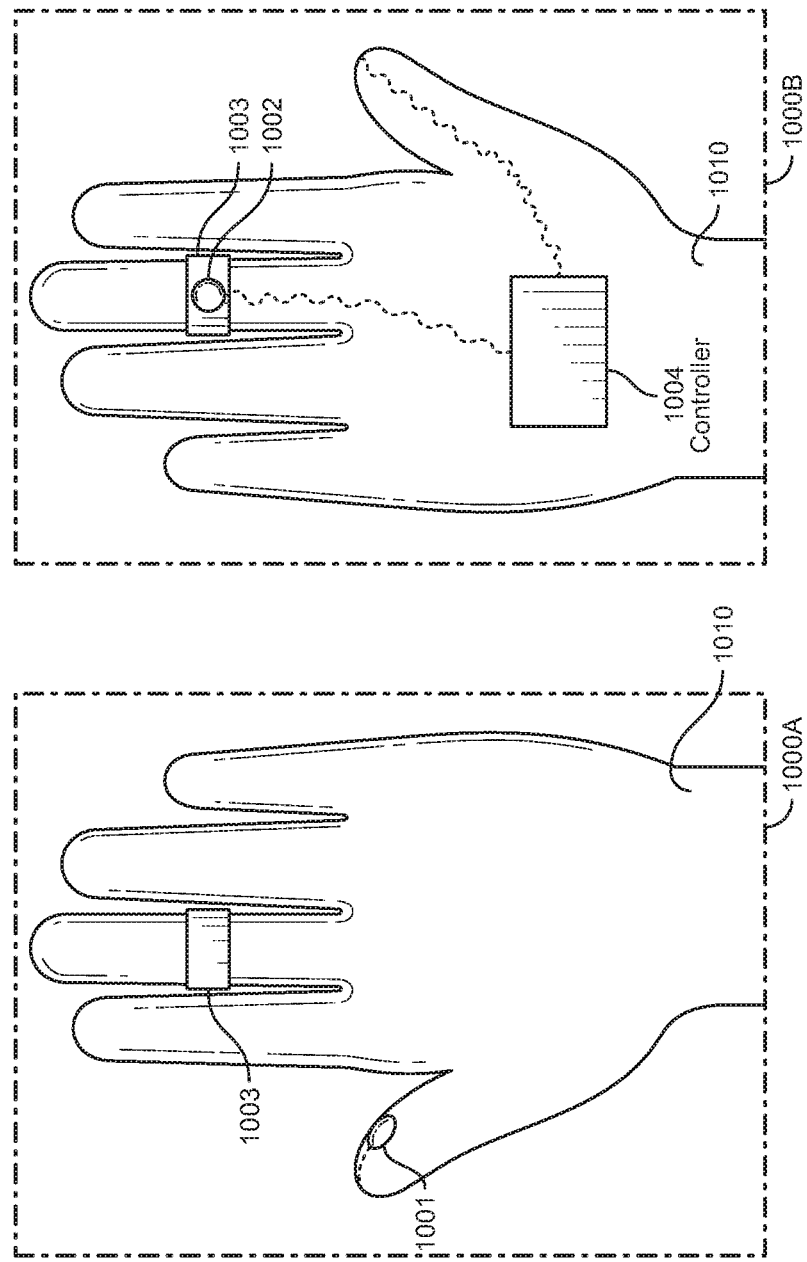
FIG. 10 illustrates an alternative embodiment of a proximity detection system embedded in at least a partial glove.

FIG. 10 illustrates an alternative haptic glove embodiment in which a specialized type of cuff is implemented. Box 1000A illustrates the palm side of a haptic glove 1010, and box 1000B illustrates the back side of the haptic glove 1010. As in FIG. 9, one electrode (1001) is mounted to the thumb. The cuff 1003 may include a conductive material such as, for example, conductive thread. The cuff 1003 may be located over an electrode 1002 that may be integrated into the glove 1010. In some cases, the electrode 1002 may be located on the back of the hand (as shown in Box 1000B) to simplify conductor routing. The cuff 1003 may be a floating conductor, in which case the TX electrode 1002 may capacitively couple to the cuff. The cuff 1003 may then capacitively couple to the RX electrode 1001. This embodiment may provide greater control of the conductor routing (since the cuff 1003 is a floating conductor) and thus may be allow more freedom in placing electrodes throughout the glove 1010.

Figure 11:
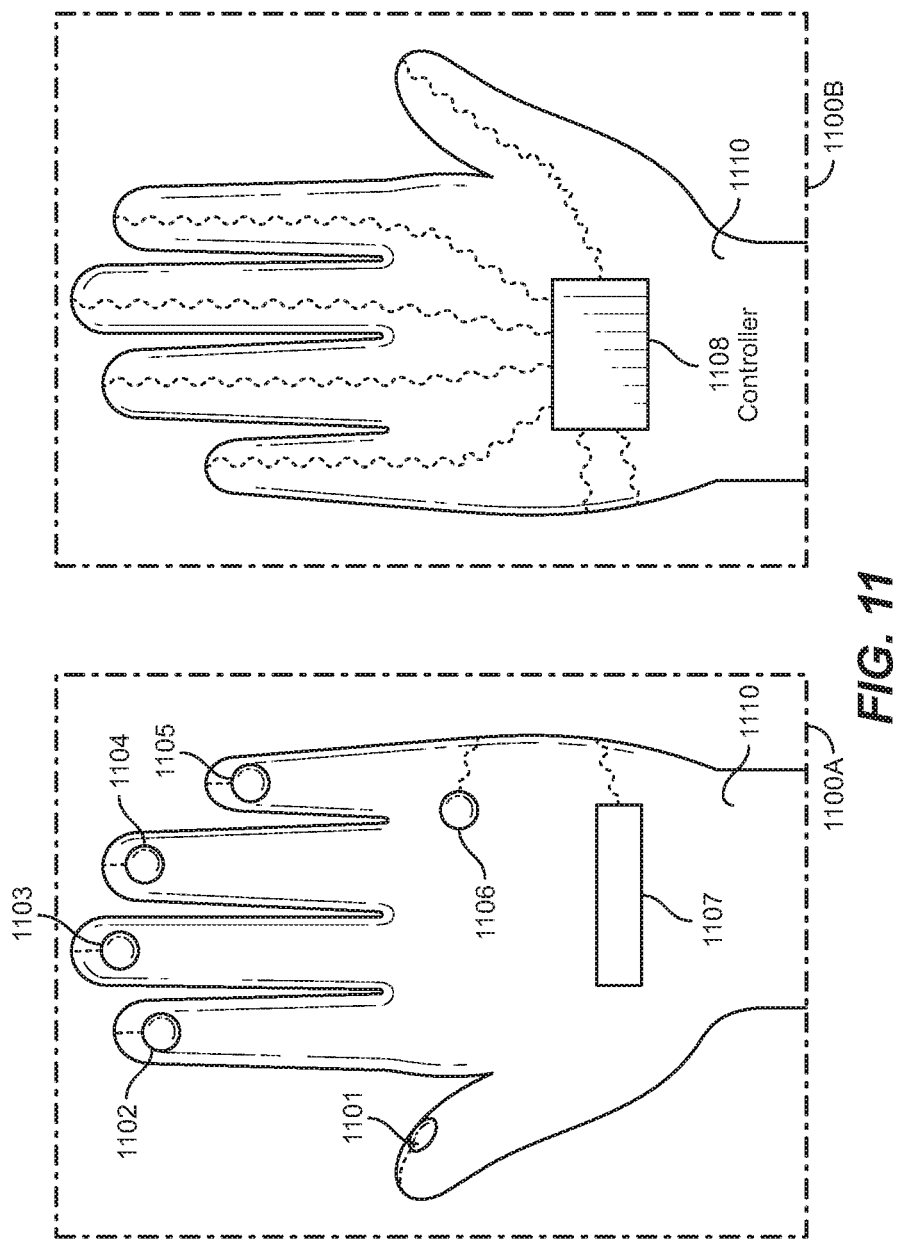
FIG. 11 illustrates an alternative embodiment of a proximity detection system embedded in at least a partial glove.

FIG. 11 illustrates an alternative embodiment of a haptic glove 1110 in which electrodes are positioned in a manner to detect additional gestures. Box 1100A illustrates the palm side of haptic glove 1110, and box 1100B illustrates the back side of the haptic glove 1110. Electrodes 1101, and 1107 may be RX electrodes, and electrodes 1102, 1103, 1104, 1105, and 1106 may be TX electrodes. When electrode 1101 touches electrode 1106, the controller 1108 may sense the gesture of the thumb touching the palm near the base of the pinkie finger. When electrodes 1102, 1103, 1104, and/or 1105 touch electrode 1107, the controller 1108 may sense a closed hand. In some cases, electrode 1107 may be broken down into multiple separate electrodes to detect which fingertip is touching the bottom of the palm. These additional gestures may provide different inputs for a more expressive user interface or may allow more nuanced interactions with virtual objects. In some embodiments, additional electrodes may be placed on facing sides of fingers to measure abduction, i.e., spread of fingers. Opposing electrodes may be RX and TX, respectively. In such cases, the distance between electrodes may be determined by measuring capacitance between electrodes. Wiring may be simplified if, for example, the ring finger electrodes in such cases are both RX or are both TX electrodes on each side of the finger. In some cases, the electrodes may encircle the finger, as with the cuff 1003 of FIG. 10.

Figure 12A:
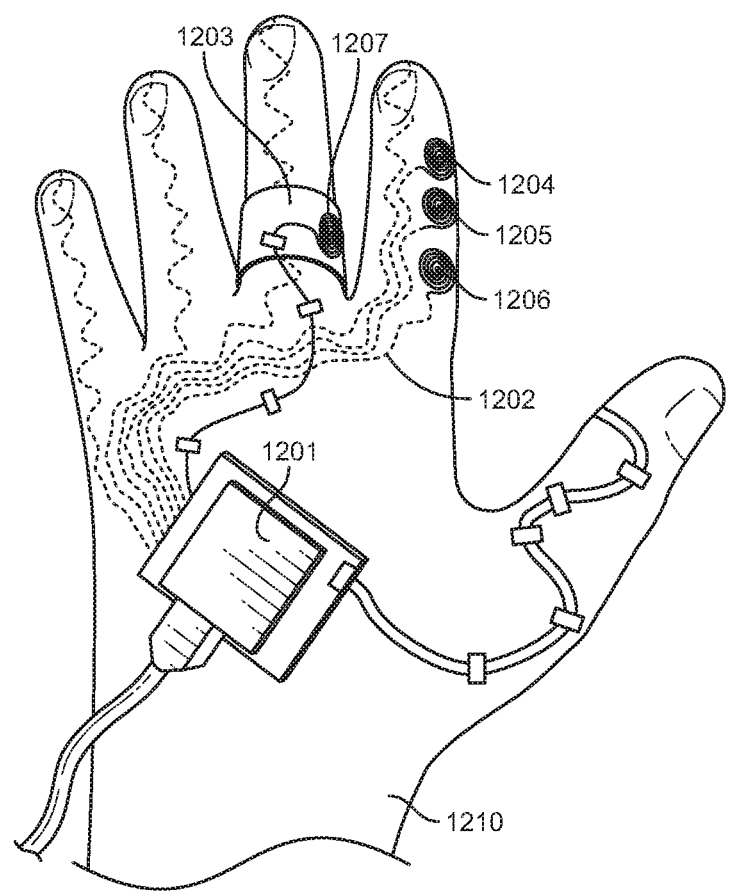
FIG. 12A illustrates an alternative embodiment of a proximity detection system embedded in at least a partial glove.
Figure 12B:
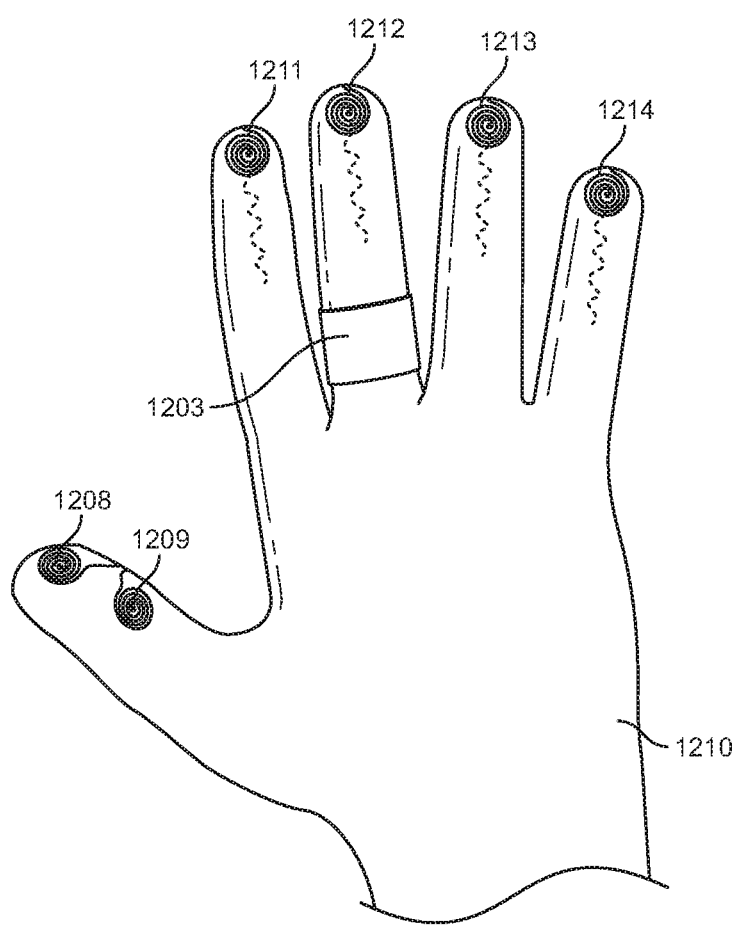
FIG. 12B illustrates an alternative embodiment of a proximity detection system embedded in at least a partial glove.

FIGS. 12A and 12B illustrate an embodiment of a haptic glove 1210 that includes a plurality of different electrodes embedded in a variety of different locations on the glove. The controller 1201 may be connected to each of these electrodes via conductors 1202. At least in some embodiments, any or all of these electrodes may function as transducers for providing tactile feedback, as well as electrodes for measuring mutual capacitance. In some cases, the electrodes (e.g., 1203-1209 and 1211-1214) may be embedded in an embroidered patch that is fastened to the haptic glove 1210. For example, as shown in FIGS. 13A-13D, the electrodes may be embedded in embroidered patches in a variety of different designs. Additionally or alternatively, the embroidered patches 1301, 1302, 1303, and 1304 may themselves be electrodes, constructed out of conductive thread or other suitable material.

These embroidered electrodes may be very flexible and thus may be comfortable to wear. Electrode 1301 is illustrated in a serpentine pattern. In some embodiments, the path on the RX electrode may be rotated 90 degrees from the path on the TX electrode to avoid variable coupling that may be caused by varying alignment between the patterns. For example, the fingers may have the turn radiuses aligned in a line that is perpendicular to the longitudinal axis of the finger. This may allow for long runs that are flexible along the bend radius of the finger. In some cases, the turn radiuses of the thumb may be aligned parallel to the longitudinal axis of the thumb. Technical embroidery machines may be used to place the conductor (e.g., 1202 of FIG. 2) and may also be used to stitch across the conductor. The pattern 1302 may achieve higher conductor density by rotating the turn radiuses relative to each other. The pattern 1302 may also be less sensitive to alignment between the pattern on a TX and RX electrode.

Figure 13A:
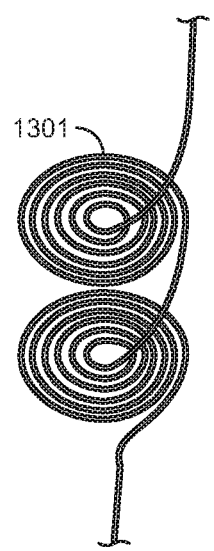
FIGS. 13A-13D illustrate a plurality of embodiments in which electrode may be embroidered into artificial reality bodywear.
Figure 13B:
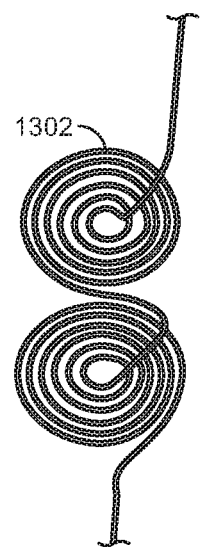

It should be noted that, in these embodiments, the electrode conductor density may not need to be 100% (e.g., a conductive foil). Less density, for example, may translate to more flexibility and more comfort. In some cases, 50% density may be used, and in some cases, density less than 10% may be used. For instance, the pattern 1303 exhibits a lower density than 1301, 1302 or 1304 and may thus provide greater flexibility. In other cases, a conductive mesh (e.g., a conductive grid made of conductive thread) may be used for an electrode. In at least some of these examples, the electrode and the conductor connecting the electrode to the electronics may be a continuous wire. In some cases, a minimalist electrode may be a single wire. In such cases, the designation between what is electrode and what is conductor may be whether the section can be touched by another electrode of opposite function (RX vs. TX). Accordingly, as shown in FIGS. 12 and 13A-13B, the electrodes described herein may be implemented in many different patterns and may be composed of many different types of materials that may conduct or not conduct. Some of these materials, such as conductive thread, may be advantageous when implementing into artificial reality devices as the devices may be lighter and more flexible and thus more comfortable to wear over time.

Figure 14A:
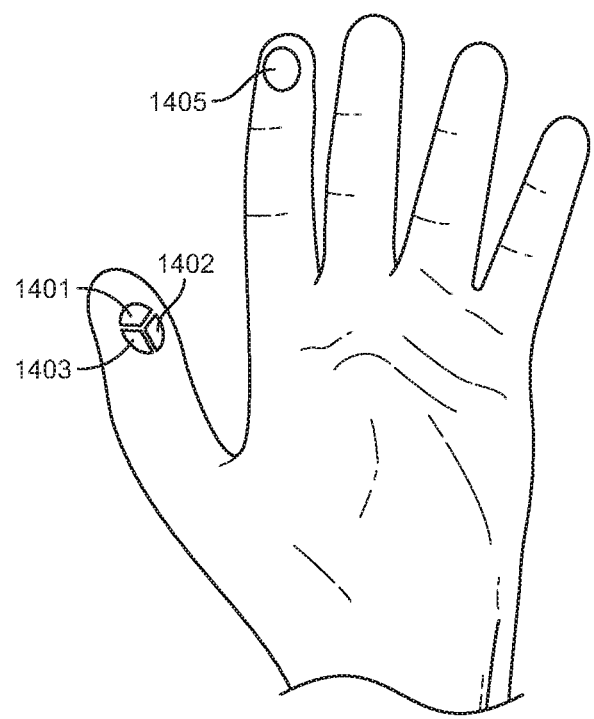
FIGS. 14A and 14B illustrate an alternative embodiment of a proximity detection system embedded in at least a partial glove.
Figure 14B:
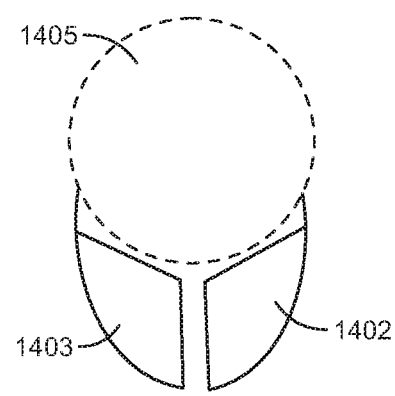

FIGS. 14A and 14B illustrate an embodiment in which multiple electrodes may be arranged in a pattern adjacent to each other to form a grid of electrodes. For example, in FIG. 14A, electrodes 1401, 1402 and 1403 may be arranged in a circular pattern. As such, when an opposing electrode (e.g., 1405) comes into proximity with the grid of electrodes, a controller that is communicatively coupled to the electrodes may determine a grid position indicating the location of the opposing electrode 1405 relative to the grid of electrodes. Thus, for example, as shown in FIG. 14B, when the user slides the opposing electrode 1405 over electrode 1401 and partially onto electrodes 1402 and 1403, electrode 1401 may register a high capacitance reading as a majority of the opposing electrode 1405 is near or touching the electrode 1401. Electrodes 1402 and 1402 may each register a lesser amount of mutual capacitance between themselves and the opposing electrode 1405. As the opposing electrode 1405 moves over the grid (which may include more or fewer electrodes than three), each individual electrode in the grid may continually report its current charge level. The controller may then calculate, based on the input signals from each of the electrodes in the grid, a combined grid position indicator indicating where the opposing electrode is relative to the grid. In this manner, the user's thumb and pointer finger may function as a trackpad, where the trackpad is completely untethered and can move with the user as part of the glove or other haptic device.

In addition to or as an alternative to the embodiments described above, at least one embodiment may include the following: a glove having a palm side and a back side, and at least two electrodes positioned on at least two separate fingertips of the glove. In this embodiment, the electrodes may be formed from insulated wires located on the glove, and the insulated wires may be routed from each of the at least two fingertips, respectively, to at least a portion of the back side of the glove. For example, as noted earlier with respect to FIG. 7, a glove 710 may be provided that includes electrodes 701 and 702, positioned on the thumb and pointer finger, respectively. Box 700A of FIG. 7 illustrates the palm of the glove 710, and box 700B illustrates the back of the glove 710.

In some embodiments, the controller 708 may be optional. Indeed, the glove 710 may be manufactured to include mesh or other materials forming the glove, and one or more insulated wires (e.g., 707) that form the electrodes. The insulated wires 707 may form any of the electrodes 701-706 and may include other electrodes (not shown). In some embodiments, the glove 710 may be communicatively coupled to an artificial reality device. For example, the glove 710 may be communicatively coupled to any of artificial reality devices 100, 200 or 300 of FIG. 1, 2 or 3, respectively. This coupling may allow actuation signals and/or measurement signals to be transmitted from the artificial reality device to the electrodes (e.g., 701 and 702) on the glove 710.

In some cases, at least one of the electrodes is positioned on an edge of a finger on the glove 710. For example, electrode 701 may be positioned on the edge of the thumb in the glove 710 shown in box 700A. Additionally or alternatively, electrodes may be positioned on the edges of other fingers. These electrodes may be in addition to or an alternative to the electrodes positioned on the fingertips (e.g., 702-705). For instance, in some cases, an electrode positioned on a fingertip may be electrically connected to an electrode positioned on the edge of the same finger. Each of these electrodes may be arranged in different forms.

Indeed, as shown in FIGS. 12A-12B and 13A-13B, the electrodes 1208-1214 or 1301-1302 may be arranged in a spiral. The spiral may be a relatively dense spiral, with each loop of the wire wrapped closely to the other loops, or the spiral may be relatively loose, with each loop of the wire wrapped relatively far apart from the other loops. In some cases, the "tightness" of the spiral or the amount of distance between loops may be referred to as a fill density. If an electrode spiral (e.g., 1301) has a fill density of 100%, then the loops of the spiral may be touching each other, whereas if an electrode spiral has a fill density of 0%, then the loops of the spiral may be positioned as far apart as the length of wire will allow. In some cases, the electrodes may be constructed with less than 50% fill density and, in some embodiments, the electrodes may be constructed with less than 10% fill density.

Figure 13C:
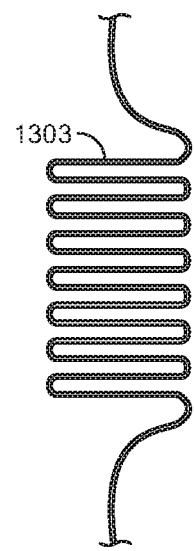
Figure 13D:
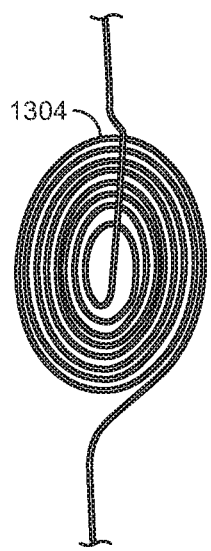

FIG. 13C illustrates an embodiment in which an electrode 1303 is formed from a conductor arranged in a serpentine pattern with one or more parallel runs. Thus, the electrode 1303 may begin with an initial length of wire, curve until perpendicular, then curve 180 degrees until parallel for a length, then curve 180 degrees until parallel for a length, and so on. Such a serpentine pattern may also be manufactured at a given fill density including less than 50%, less than 10%, or at some other fill density. FIG. 13D illustrates an embodiment in which an electrode is arranged in a distorted serpentine pattern. Such a pattern may mimic a human fingerprint. These serpentine electrodes may be positioned around the radius of the fingertips of the glove (e.g., glove 1210 of FIG. 12B). In some embodiments, serpentine electrodes (e.g., 1303) may be positioned on at least one finger of the glove, and spiral electrodes (e.g., 1301) may be positioned on a thumb of the glove. This may help to avoid scenarios where parallel runs of wires may potentially touch each other.

In some cases, the insulated wires (e.g., 707 of FIG. 7) may be routed with a specified minimum distance between them. In some embodiments, this specified minimum distance may be at least five millimeters. In some cases, these wires may be used to form RX electrodes and TX electrodes. Accordingly, in such cases, the wires forming the RX electrodes and the wires forming the TX electrodes may be positioned at least five millimeters apart to avoid interference. Gloves with RX and TX electrodes may be manufactured to include fewer RX electrodes than TX electrodes. For example, in FIG. 7, electrodes 701 and 706 may be RX electrodes and electrodes 702, 703, 704, and 705 may be TX electrodes.

The insulated wires that form these electrodes may be routed in a manner that avoids sharp bends in the glove 710. For example, as shown on the back side of glove 1210 of FIG. 12A, the wires 1202 may be routed away from locations on the hand where sharp bends may occur such as on the palm side of the fingers or hand. By routing the wires in a manner that avoids the sharp bends, the wires may enjoy a longer lifespan before breaking due to being repeatedly bent. In some embodiments, electrodes may be placed on different locations on the glove, other than the fingertips. For instance, electrodes may be positioned on the sides of fingers such as electrodes 1204-1207 of FIG. 12A. In some cases, at least two of these electrodes may be positioned along opposing sides of adjacent fingers in the glove 1210. When placed along opposing sides of adjacent fingers, the electrodes may be implemented to measure finger abduction including rate of movement apart and together, as well as distance between the fingers.

In some embodiments, the glove and corresponding electrodes may be connected to a controller. For example, the wires 1202 of FIG. 12A may be connected to controller 1201. This controller may, however, be optional, and may not be included as part of the glove 1210. In cases where the controller 1201 is included with the glove, the controller may be mounted to the back side of the glove 1210 or to some other part of the glove. In other cases, a controller may be implemented with the wires 1202 and glove 1210, but the controller may be remote to the glove, located in another location away from the glove. In such cases, the controller may be communicatively connected to the wires 1202 to send and receive signals to and from the electrodes. In this manner, regardless of where the controller is located, the may communicate with and control the electrodes on the glove and, in some cases, may use the electrodes to both measure mutual capacitance and provide tactile feedback to the user.

Accordingly, the various embodiments described herein may provide a variety of different methods and systems for detecting touch in an artificial reality system. The embodiments may use a variety of different types of electrodes in multiple different configurations. In some embodiments, the electrodes may function as both charge-detecting electrodes and as actuators, providing haptic feedback upon receiving driving signals. These electrodes may be employed on a variety of different haptic feedback devices including the many alternative types of gloves described herein above.

As detailed above, the controllers, computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data into a charge measurement, output a result of the transformation to create an input signal, use the result of the transformation to generate haptic feedback, and store the result of the transformation as potential feedback for other sensors. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. A system comprising: at least two electrodes communicatively coupled to an artificial reality device; and a controller configured to: detect an amount of electrical charge at, at least one of the electrodes; based on the detected amount of electrical charge at the at least one electrode, determine a mutual capacitance measurement that indicates an amount of mutual capacitance between the at least two electrodes; based on the determined mutual capacitance measurement, determine a relative proximity status between the at least two electrodes, the relative proximity status indicating a degree to which the electrodes are in proximity with each other; and provide the determined relative proximity status between the at least two electrodes as an input to the artificial reality device.

2. The system of claim 1, wherein the controller determines the mutual capacitance measurement based on the detected amount of electrical charge at both of the at least two electrodes.

3. The system of claim 2, wherein the controller determines when insulators between the at least two electrodes are touching each other.

4. The system of claim 3, wherein the controller determines when the at least two touching electrodes have ceased touching each other.

5. The system of claim 2, wherein the system comprises three or more electrodes communicatively coupled to the artificial reality device.

6. The system of claim 5, wherein the controller determines which two electrodes among the three or more electrodes are within a specified distance of each other.

7. The system of claim 1, wherein the at least two electrodes are embedded within at least a partial glove configured to fit on at least a portion of a user's hand.

8. The system of claim 1, wherein at least one of the electrodes comprises a transducer configured to provide a tangible movement upon receiving a triggering input.

9. The system of claim 8, wherein the at least one electrode comprising a transducer is configured to provide the tangible movement while the controller determines the mutual capacitance measurement between the at least two electrodes.

10. The system of claim 8, wherein signals controlling the transducer are transferred over the same wire as signals used to detect mutual capacitance at the transducer.

11. The system of claim 1, wherein the controller receives feedback from at least one of the electrodes, and wherein the controller uses the received feedback to calibrate one or more other sensors communicatively coupled to the system.

12. The system of claim 1, wherein at least one of the electrodes is mounted into a cuff that is positioned over at least one finger.

13. A computer-implemented method for determining a proximity status between electrodes, comprising: detecting an amount of electrical charge at, at least one electrode among at least two electrodes that are communicatively coupled to an artificial reality device; based on the detected amount of electrical charge at the at least one electrode, determining a mutual capacitance measurement that indicates an amount of mutual capacitance between the at least two electrodes; based on the determined mutual capacitance measurement, determining a relative proximity status between the at least two electrodes, the relative proximity status indicating a degree to which the electrodes are in proximity with each other; and providing the determined relative proximity status between the at least two electrodes as an input to the artificial reality device.

14. The computer-implemented method of claim 13, wherein at least one of the electrodes comprises a stretch sensor, and wherein the stretch sensor is configured to detect an amount of stretch in the artificial reality device while the mutual capacitance measurement between the at least two electrodes is being determined.

15. The computer-implemented method of claim 13, wherein the at least two electrodes are embedded in an embroidered patch that is fastened to the artificial reality device.

16. The computer-implemented method of claim 13, wherein the artificial reality device comprises at least a partial glove, and wherein a thumb covering of the glove includes at least one electrode and an index finger covering of the glove includes at least two electrodes.

17. The computer-implemented method of claim 16, further comprising detecting a sliding movement between the at least one electrode of the thumb covering and the at least two electrodes of the index finger covering.

18. The computer-implemented method of claim 13, wherein at least one of the electrodes is mounted into a cuff that is positioned over at least one finger.

19. The computer-implemented method of claim 13, wherein a plurality of additional electrodes are implemented to allow users to input gestures to the artificial reality device.

20. The computer-implemented method of claim 13, wherein multiple electrodes are arranged in a pattern adjacent to each other forming a grid of electrodes, such that when an opposing electrode comes into proximity with the grid of electrodes, a grid position is determined indicating the location of the opposing electrode relative to the grid of electrodes.

21. A non-transitory computer-readable medium comprising one or more computer-executable instructions that, when executed by at least one processor of a computing device, cause the computing device to: detect an amount of electrical charge at, at least one electrode among at least two electrodes that are communicatively coupled to an artificial reality device; based on the detected amount of electrical charge at the at least one electrode, determine a mutual capacitance measurement that indicates an amount of mutual capacitance between the at least two electrodes; based on the determined mutual capacitance measurement, determine a relative proximity status between the at least two electrodes, the relative proximity status indicating a degree to which the electrodes are in proximity with each other; and provide the determined relative proximity status between the at least two electrodes as an input to the artificial reality device.

* * * * *